United States Patent

Buzzard et al.

[15] 3,649,759

[45] Mar. 14, 1972

[54] MULTIPLE DATA SET WHICH TIME-SHARES CIRCUITRY AMONG A PLURALITY OF CHANNELS

[72] Inventors: Clair A. Buzzard, Eatontown; Gerald P. Pasternack, Colts Neck; Burton R. Saltzberg, Middletown, all of N.J.

[73] Assignee: Bell Telephone Laboratories, Incorporated, Murray Hill, N.J.

[22] Filed: Dec. 11, 1969

[21] Appl. No.: 884,251

[52] U.S. Cl. ..........................179/2 DP, 340/172.5, 179/18 J, 179/15 A

[51] Int. Cl. ..........................H04m 11/06

[58] Field of Search ..........................179/2 DP, 15 A, 15 AS, 18 J; 340/172.5

[56] References Cited

UNITED STATES PATENTS

| | | | |
|---|---|---|---|
| 3,529,087 | 9/1970 | Kawase et al. | 179/2 A |
| 3,526,878 | 9/1970 | Bennett | 340/172.5 |
| 3,522,381 | 7/1970 | Feder | 179/15 A |
| 3,362,015 | 1/1968 | Mackie et al | 179/18 J |
| 3,133,268 | 5/1964 | Avakian et al | 340/172.5 |
| 3,042,752 | 7/1962 | Fulmer | 179/15 AS |
| Re25,911 | 1/1965 | Vaughan | 179/18 J |

*Primary Examiner*—Kathleen H. Claffy
*Assistant Examiner*—Tom D'Amico
*Attorney*—R. J. Guenther and Kenneth B. Hamlin

[57] ABSTRACT

A plurality of telephone lines which convey frequency-shift signals and a corresponding plurality of data machines, which send and receive DC baseband data, are interconnected via a time-shared digital (filter) circuit receiver and digital circuit modulator under the supervision of a common central processor. The processor follows the progress of each call and determines when supervisory functions are required. These functions includes placing the telephone line in an on-hook or an off-hook condition, returning answer back signals, monitoring the line for incoming calls by detecting incoming ringing signals and, after the call is answered, monitoring the line for a continuous connection by detecting incoming carrier signals. A low-pass digital filter is arranged to filter the incoming signals to detect ringing or, alternatively, to filter the sum of the signaling frequencies to detect carrier. To detect the low-frequency ringing, the response of the filter is modified by limiting the rate at which the input signals are applied thereto and by "holding" the processed signals in the filter for the prolonged interval between the input signal applications.

9 Claims, 5 Drawing Figures

INVENTORS C. A. BUZZARD
G. P. PASTERNACK
B. R. SALTZBERG

BY R C Lipton
ATTORNEY

MULTIPLE DATA SET WHICH TIME-SHARES CIRCUITRY AMONG A PLURALITY OF CHANNELS

FIELD OF THE INVENTION

This invention relates to multiple data sets and, more particularly, to a time-shared data set which interconnects a plurality of data-processing machines capable of sending and receiving baseband data signals and a corresponding plurality of telephone channels capable of conveying voice frequency data signals.

DESCRIPTION OF THE PRIOR ART

In the data-processing and data-switching arts the data-processing machine or switcher terminates large numbers of (two-way) data-signaling channels. The data channel, in many instances, will comprise a telephone line which conventionally is suitable to convey voice frequency signals and, more particularly, frequency-shift data signals whereas the data machine sends and receives DC baseband data signals. Converting the DC baseband signals to frequency-shift signals for application to the telephone channel and recovering the DC baseband signal from the frequency-shift signals on the telephone channel is provided by a data set sender-receiver. In addition, the data set provides supervisory functions such as answering incoming calls (by detecting ringing, by placing the telephone line in the off-hook condition and by returning an answer back signal); interconnecting the telephone line with the data machine by way of the sending and receiving circuits while checking that the connection is maintained with the calling station (by monitoring the line for continuous incoming carrier); and terminating the calls (by detecting disconnect signals and by placing the line in the on-hook condition).

Since the plurality of channels are terminated, the data sets for the various channels are sometimes grouped together to form an arrangement called a multiple data set. To reduce the size, cost and complexity of the multiple data set, it is advantageous to employ equipment which can be used in common by all the data sets. One such common equipment, used in the past, is a common power supply supplying the power requirements of all of the data sets.

It is a broad object of this invention to further reduce the size, cost and complexity of the data set.

As pointed out above, the most significant circuits in the data set include the transmitter (for converting the DC baseband signal to frequency-shift signals), the receiver (for demodulating the incoming frequency-shift signal), the ringing signal detector and the carrier detector. These circuits are customarily individually assigned to each data set. It is known, however, that digital circuitry can be shared by a plurality of signal sources or channels on a time-division basis. It is further known that analog functions can be simulated by digital circuitry, such as by circuits using digital filtering techniques.

Digital filtering is the computational process wherein sequential numbers which define samples of an analog signal are digitally processed to simulate continuous filtering functions. The digital filter is, therefore, the digital circuit which performs the computational process. The filtering process involves the weighting of previous and present samples of the signal. One way this can be implemented is to store the filter output numbers until the next sample arrives and then feed back the numbers through multipliers, which determine the coefficients of the filter, and add the multiplied number to the next input number. The output of the digital filter then comprises numbers in sequence which represent signal samples of an analog signal corresponding to the output of an analog filter. It is obvious that a plurality of signals can be processed in this manner by multiplexing on a time-division basis the numbers representing the samples of the various signals. The digital filter is therefore capable of being shared on a time-shared basis by a plurality of channels.

Accordingly, it is a further object of this invention to time share digital circuitry which perform analog functions. Specifically, it is an object of this invention to time share a modulator and a receiver (both including digital circuitry) among a plurality of data sets.

Examination of the supervisory functions of the data set reveals that two of the analog functions are not required concurrently by the data set. Specifically, the function of detecting ringing is provided only when the data set is in initial or answering states or modes while the function of detecting carrier is provided only after the termination of the answering states. Therefore, it is another object of this invention to not only time share digital circuitry performing analog functions but to also provide time-shared digital circuitry which performs different analog functions.

SUMMARY OF THE INVENTION

The specific embodiment of this invention described hereinafter comprises a multiple data set for interconnecting a plurality of data machines and a corresponding plurality of telephone line transmission channels. The telephone line transmission channels are scanned and samples of the signals thereon are applied to a time-shared digital receiver which converts the signal samples to DC baseband data samples. With respect to outgoing signals, a time-shared digital modulator converts locally generated DC baseband data signal samples to voice frequency signal samples which are distributed to the appropriate telephone lines. Supervisory control of the multiple data set is exercised by a common central processor which, when incoming calls are received, distributes the output DC baseband data samples of the digital receiver to the appropriate data machines and scans the data machine to obtain samples of DC baseband data being transmitted by the machines for application to the digital modulator.

The common central processor is advantageously a sequential machine which, for each channel on a time-shared basis, assumes various states simulating the corresponding states that a data set assumes during the progress of a call. In accordance therewith, the sequential machine includes a translator responsive to incoming calls and signals for determining the identity of the next state to be assumed and further includes a translator responsive to incoming calls and signals and to the state assumed by the sequential machine for controlling supervisory functions such as the data sample distribution to the data machines, the scanning of the data being transmitted by the data machine, the placing of telephone lines in the off-hook condition in response to incoming calls and in the on-hook condition when the call is terminated and the generation of supervisory signals (such as answer back signals) for application to the modulator.

The common central processor also arranges the data set to look for incoming ringing signals when it is in the initial or answering states. Upon determining that valid ringing is being received, the common central processor advances to states wherein the data machine is interconnected with the telephone line and the line is monitored for continuous incoming carrier. In accordance with a feature of this invention, there is provided a common digital circuit detector which the central processor can arrange to alternatively detect incoming ringing or incoming carrier signals. More specifically, the detector comprises a low-pass digital filter which filters the incoming signals to detect ringing and which filters the sum of the signaling frequencies to detect carrier. The signaling frequencies, in turn, are obtained from resonators in the receiver and summed in an adder circuit.

The foregoing and other objects and features of this invention will be more fully understood from the following description of an illustrative embodiment thereof taken in conjunction with the accompanying drawings.

DETAILED DESCRIPTION

General Arrangement

Figure 1:
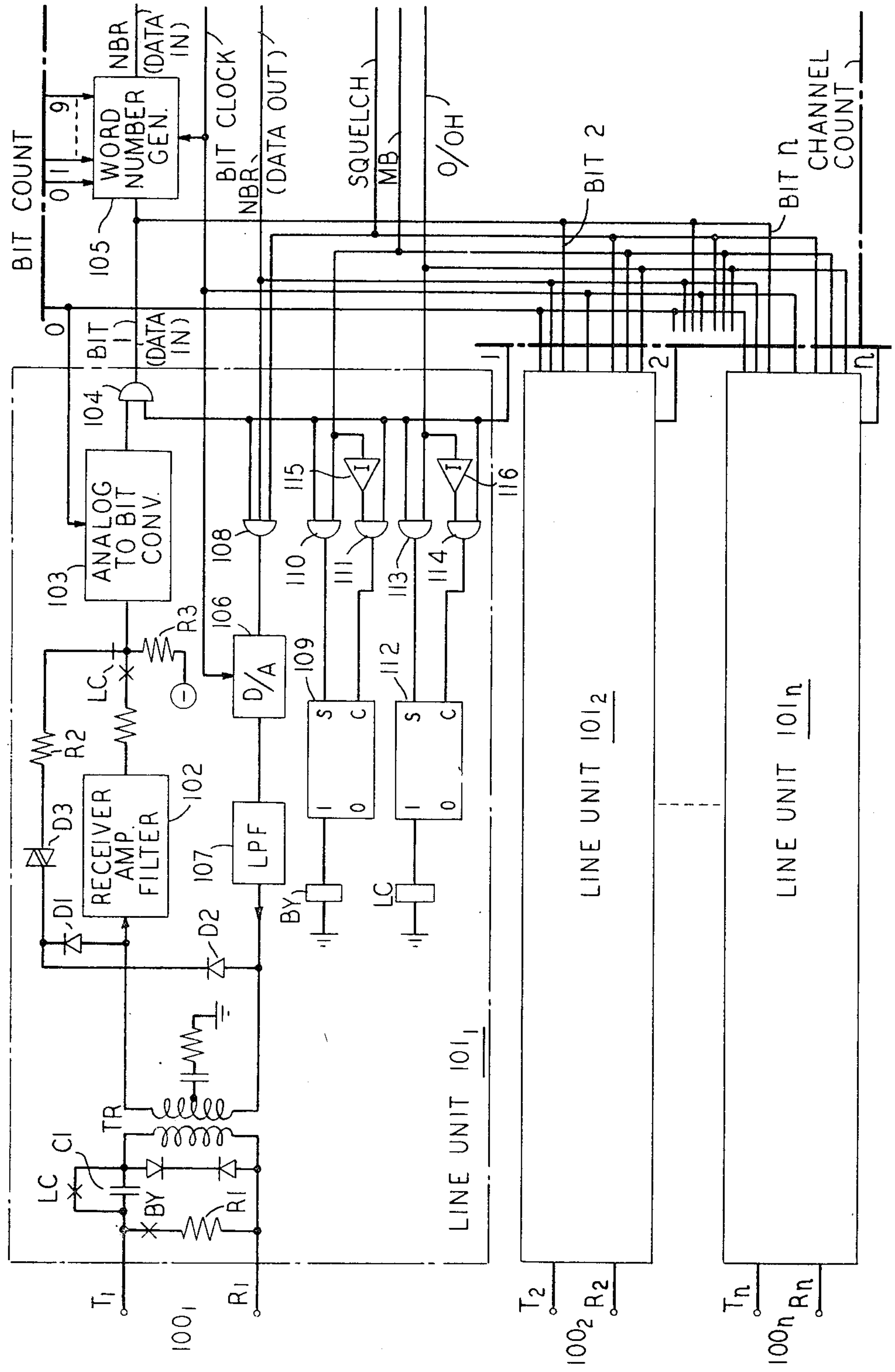
FIG. 1 and FIG. 2, when arranged side by side, disclose in block and schematic form the various circuits and equipment which form a multiple data set in accordance with this invention.
Figure 2:
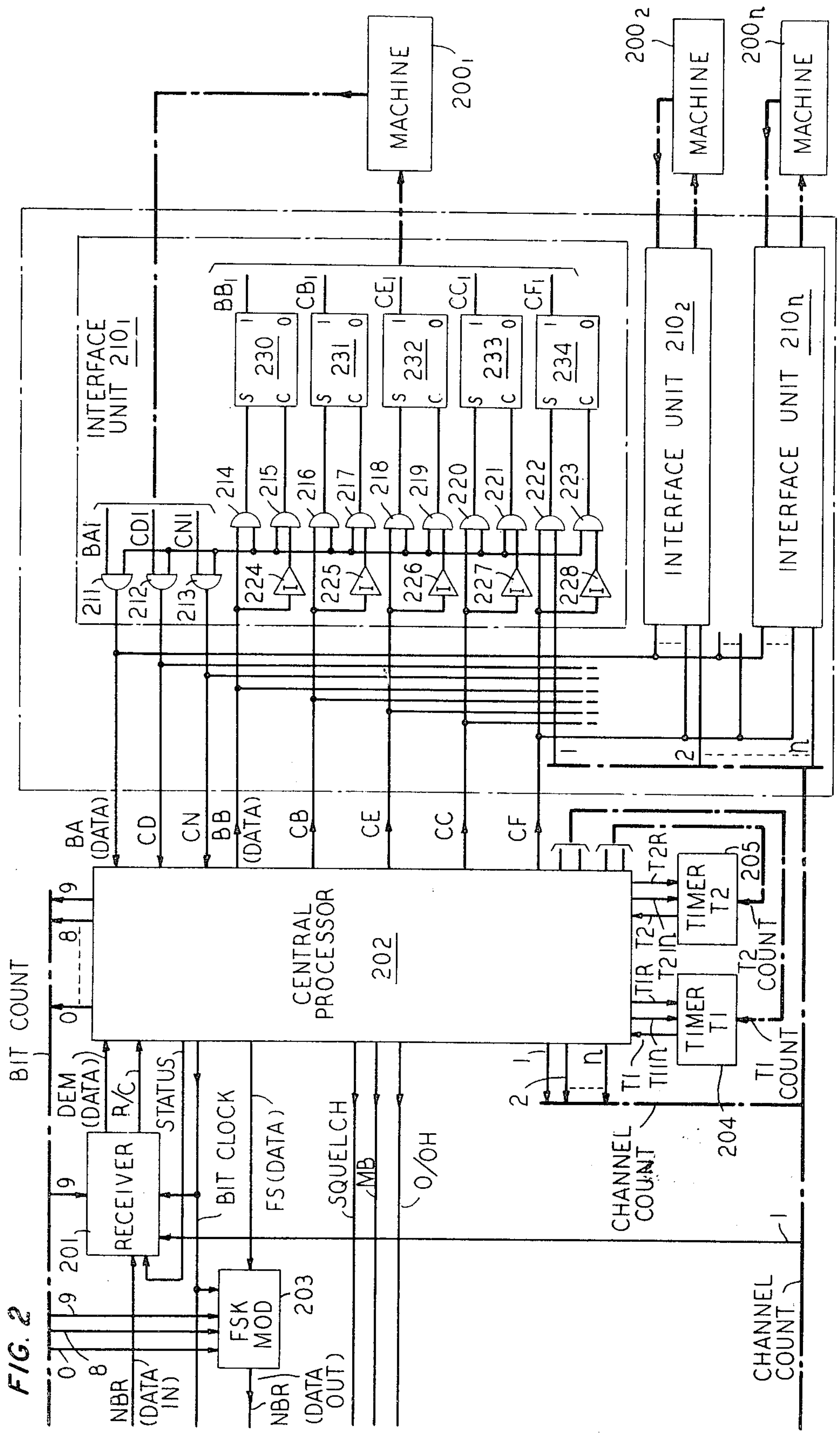

The time-shared data set is arranged to interconnect a plurality of telephone lines, such as telephone lines 100$_1$ through 100$_n$ in FIG. 1, and a corresponding plurality of data-processing machines, such as machines 200$_1$ through 200$_n$ in FIG. 2. It is noted that the multiple data set is arranged to handle only incoming calls. It will be apparent to one skilled in the art, however, that modifications may be made to enable the various data-processing machines to originate outgoing calls over the corresponding telephone lines.

Each data-processing machine has the capability of sending and receiving DC baseband data signals. In addition, each machine provides information indicating that the particular machine is available or ready or, alternatively, that the machine is busy or unavailable. The machine further requires incoming information, which comprises the indications that ringing is being received over the associated telephone line; that a carrier signal is being received; that the data set is ready and available; and, finally, that the data set is in a data mode wherein it is permissible (or clear) for the machine to send data. The following table lists the input and output leads of the business machine (which leads are identified in FIG. 2 with an appropriate subscript to correspond to the subscript designating the machine), and the data or information carried by the leads:

OUTPUT

| | |
|---|---|
| BA | Outgoing data |
| CD | Machine ready |
| CN | Make busy |

INPUT

| | |
|---|---|
| BB | Incoming data |
| CB | Clear to send |
| CC | Data set ready |
| CE | Ringing being received |
| CF | Carrier being received |

All of the above-listed machine leads extend from each machine to one of interface units 210$_1$ through 210$_n$ associated with the particular data-processing machine. The interface unit accepts the information on the machine output leads and, under control of leads *1* to *n* of leads CHANNEL COUNT, multiplexes this information with the corresponding information from the other data-processing machines. Interface unit 210$_1$, for example, inserts the machine information from leads BA$_1$, CD$_1$ and CN$_1$ of machine 200$_1$ in the first time slot allocated to the first channel, under control of lead 1 of the CHANNEL COUNT leads, and passes this information to central processor 202 by way of common leads BA (DATA), CD and CN. Accordingly, during each scanning cycle of the multiple data set, the output information of the various machines is multiplexed on leads BA, CD and CN which then provide input information to central processor 202.

During the above-mentioned scanning cycle, central processor 202, as described in detail hereinafter, provides multiplexed information on leads BB, CB, CC, CE and CF to each of the machines. The interface units distribute the information to the machines under control of the CHANNEL COUNT leads. With respect to interface unit 210$_1$, central processor 202 passes information destined for machine 200$_1$ to these latter leads during the first time slot of the cycle. Interface unit 210$_1$, as described in detail hereinafter, utilizes the pulse on lead 1 of the CHANNEL COUNT leads to select the information on the various leads in the first time slot and passes the information to correspondingly identified leads (having the appropriate subscript), which leads extend to data-processing machine 200$_1$. The interface unit, therefore, provides the interchange of information between the data-processing machine and central processor 202.

Telephone lines 100$_1$ through 100$_n$ terminate in corresponding line units 101$_1$ through 101$_n$. Incoming signals from each telephone line are, therefore, passed to its associated line unit. When a remote station calls the data processing machine, (20-cycle) ringing signals are received over the incoming telephone line. After the call is answered, the incoming signals comprise voice frequency-shift data signals. In the specific embodiment shown, the voice frequency signals comprise 1,270 Hz.-marking frequency and 1,070 Hz.-spacing frequency. The outgoing signals passed by the line unit to the corresponding telephone line comprise the supervisory on-hook and off-hook signals (and a simulated off-hook busy signal) and, during the transmission of data, 2,225 Hz.-marking frequency and 2,025 Hz.-spacing frequency.

Each line unit, upon accepting the incoming ringing or data signals from the associated telephone line, converts the signals to bit samples and, under control of the CHANNEL COUNTS leads, inserts the samples in a time slot (of the scanning and distributing cycle) allocated to the particular line or channel. Specifically, line unit 101$_1$ utilizes the pulse on lead 1 of the CHANNEL COUNT leads to insert each bit sample into the first time slot. This bit samples is then passed to output lead BIT 1 (DATA IN). Similarly, each of the other line units inserts their bit samples during each cycle in time slots individual thereto. All of these samples are then applied to word number generator 105.

The function of word number generator 105 is to convert each bit sample to a corresponding multibit number, all under control of leads 0 to 9 of leads BIT COUNT and lead BIT CLOCK. As described in detail hereinafter, the BIT CLOCK lead produces 10 pulses for each time slot and the 10-BIT COUNT leads are sequentially pulsed during each time slot to generate a 10-bit number. Each multibit number is therefore allocated to a time slot of a corresponding telephone line and the amplitude of the number designates the amplitude of the incoming voice frequency or ringing signal on that line. Advantageously, the word number generator is substantially identical to the word number generator described in the application of C. A. Buzzard et al., Ser. No. 884,250, filed concurrently herewith.

The multibit numbers output of word number generator 105 is passed to output lead NBR (DATA IN), which lead extends to receiver 201 in FIG. 2. Receiver 201, as described in detail hereinafter, provides the functions of processing the numbers and, under control of the BIT CLOCK lead, lead 9 of the BIT COUNT leads, lead 1 of the CHANNEL COUNT leads and lead STATUS from central processor 202, recovers signal samples which define incoming baseband data signals and generates information indicating the reception of incoming ringing signals and carrier signals. When receiver 201 processes the incoming multibit numbers to recover the baseband data signal, the resultant output is passed to output lead DEM (DATA). Under control of lead STATUS, receiver 201 alternatively looks for ringing or carrier signals and when one or the other is detected, a signal bit indicating the reception is passed to output lead R/C. Both leads DEM (DATA) and R/C extend to central processor 202 and constitute input information thereto.

Central processor 202, as described in detail hereinafter, provides signal samples to output lead FS (DATA), which signal samples define the output frequency-shift signals to be passed to the appropriate telephone line. These signal samples are applied to FSK modulator 203. It is a function of FSK modulator 203, under control of the BIT CLOCK lead and leads 0, 8 and 9 of the BIT COUNT leads, to generate frequency-shift signals (in a numerical sense) representing data signals. Frequency shift modulator 203 thereupon applies to output lead NBR (DATA OUT) a sequence of multibit numbers, each number in a time slot allocated to a telephone line and, further, each number defining the instantaneous amplitude of an outgoing frequency-shift signal. FSK modulator 203 is advantageously arranged in substantially the same manner as the modulator disclosed in the application of B. R. Saltzberg, Ser. No. 884,128, filed concurrently herewith. The output numbers on lead NBR (DATA OUT) are thereupon distributed to line units $101_1$ through $101_i$.

Each line unit now selects, under control of the CHANNEL COUNT leads, the multibit number in the time slot allocated to the telephone line terminated by the line unit. This selected number is converted, under control of the BIT COUNT lead, to an analog sample and the frequency-shift signal developed thereby is passed to the telephone line.

Each line unit has the additional function of squelching the output signals and passing on-hook and off-hook or busy signals to the telephone line. These are controlled by input leads SQUELCH, MB and O/OH, all of the leads originating in central processor 202.

As previously indicated, common control is provided by central processor 202. In general, central processor 202 allocates specific time slots to each telephone line or channel (and associated data processing machines) for the processing of data set functions allocated to the associated channel. Central processor 202 also determines the various operating states for the data set allocated to the channel. In addition, central processor 202, in conjunction with T1 timer 204 and T2 timer 205, provides on a time-shared basis various timing functions required by the multiple data set. With respect to the timing functions, central processor 202 passes information on leads T1 IN and T2 IN to the two timers, instructing the timers (for a particular time slot) to run a timing function. The information on leads T1R and T2R instructs the timers to reset and the information on multibit leads T1 COUNT and T2 COUNT defines the timing interval or duration. Return information from the counters on leads T1 and T2 designates the completion of the timing interval (or time out). Each of the timers is advantageously arranged in substantially the same manner as disclosed in the application of G. P. Pasternack, Ser. No. 884,252, filed concurrently herewith.

As previously noted, central processor 202 determines the various operating states for the multiple data set. These are determined on a time-shared basis and in accordance with two general items of information. The first item of information is defined by the present state (during any time slot) of the data set. The second general item of information comprises input information on the previously described input leads to the central processor. Under control of this information, the central processor is arranged to proceed from state to state and, in addition, provide output information and supervisory signals to the processor output leads. In the specific embodiment disclosed herein the data set can assume any one of thirteen states. In the listing below each state is allocated a letter, followed by a short description of the state.

State A the circuit is idle; all inputs of interest are off;

B a data-processing machine has requested the data set to make the corresponding telephone line busy;

C the receiver indicates that a ringing signal is being received;

D the ringing signal received by the receiver has ceased;

E the ringing signal received by the receiver is identified as valid ringing;

F the ringing signal is identified as valid, the signal has ceased and the machine is "ready." The associated telephone line is placed off-hook and a "quiet interval" is timed;

G the "quiet time" has elapsed, and the "abort time" has been initiated;

H the receiver indicates that a carrier signal is being received;

I the carrier signal received by the receiver has ceased;

J the carrier signal received by the receiver is recognized as valid carrier; the data set is placed in the "data mode";

K the receiver indicates a loss of carrier;

L the demodulator indicates that a spacing signal is being received;

M the decision to disconnect has been made; the modulator is instructed to send the required spacing disconnect signal.

Sequence of Operations

Recalling now that central processor 202 operates on a time-shared basis, the above-described states and functions of the processor will now be described relative to one of the channels, that is, the operations will be described with respect to the occurrences within one of the time slots in the scanning cycle. This description of the general operation starts with the data processor in idle state, which is identified as State A.

With central processor 202 in the idle state, a "0" bit is applied to output lead SQUELCH (during the time slot) to squelch the outgoing signal in the line unit (corresponding to the time slot or channel), a "marking" clamp is applied to output lead BB (DATA) to pass idle locking to the appropriate data processing machine, and a "0" bit is applied to output lead STATUS to enable receiver 201 to look (during the time slot) for an incoming ringing signal. If during the idle State A (ringing not being received), a signal is received from the data-processing machine on lead CN indicating that the machine requests the data set to make the telephone line busy, the central processor will proceed to State B.

Upon proceeding to State B, the central processor applies a "1" bit to output lead MB, instructing the line unit to terminate the telephone line, rendering it busy to incoming calls. The data processor will remain in State B until the busy request is removed from lead CN by the processing machine, whereupon the central processor will return to State A.

Returning now to State A, let us assume that receiver 201 indicates on lead R/C that a ringing signal is being received. Central processor 202 thereupon proceeds to State C wherein the central processor calls in and starts up timer T2 (by applying "1" bits to leads T2R and T2 IN). Central processor 202 now proceeds to time the ringing signal to determine if valid ringing is being received. The present embodiment is arranged to determine if ringing is received for at least 3 seconds. In common telephone practice, conventional ringing may constitute a 2-second ON interval followed by a 4-second OFF interval. Accordingly, this timing interval would necessarily have to time more than one ON interval, maintaining the timing count through an OFF interval.

So long as ringing continues to be received and T2 timer 205 has not timed a 3-second interval, central processor 202 remains in State C. In the event, however, that incoming ringing ceases, central processor 202 proceeds to State D. In this State, central processor 202 removes the "1" bit applied to output lead T2 IN, stopping the advance of T2 timer 205. However, central processor 202 retains the "1" bit on output lead T2R so that the timer will not be reset. The timer thereby retains a memory of the interval that ringing has been received. In State D central processor 202 also applies "1" bits to output lead T1 IN and T1R, thereby calling in and starting up T1 timer 204 to time the "no-ringing," or OFF, interval.

In State D, if the "no-ringing," or OFF, interval continues until T1 timer 204 times out and a pulse is received on input lead T1, central processor 202 returns to idle State A. If ringing resumes, however (as indicated by the restoration of the signal on incoming lead R/C), before T1 timer 204 times out, central processor 202 returns to State C wherein the "ON" interval timing is resumed.

Return now to State C, with the "ON" interval continuing. Assume that T2 timer 205 times out, passing a bit to input lead T2 of central processor 202. The central processor identifies the incoming ringing as valid and the processor advances to State E.

In State E the processor applies a bit to output lead CE, informing the data processing machine that ringing is being received. The data-processing machine will presumably return a bit on lead CD to indicate that the machine is ready. Assuming that the bit is returned on input lead CD, when ringing ceases the processor advances to State F. In the event, however, that the bit is not returned on lead CD, the processor remains in State E or, if ringing ceases (for an OFF interval, for example), returns to State D. In State D, the processor proceeds through the same steps as above described with the exception that if the data-processing machine becomes ready while the processor is still in State D (and T2 timer 205 has, of course, timed out), then the processor will advance from State D to State F.

In State F the processor will apply a bit to output lead O/OH to instruct the line unit to place the telephone line in the off-hook condition and, in addition, reset T2 timer 205 (if it is still timing) by applying a "0" bit to output lead T2R. Thereafter, while still in State F, the processor will call in T1 timer 204 to time for the "quiet time" interval. The provision of the "quiet time" interval is conventional for data transmission over telephone lines to permit echo suppressors to be disabled, enabling two-way transmission over the telephone facilities.

While in State F central processor 202 continues to check that the machine is ready. In the event that, for some reason, the machine returns a "not ready" indication on lead CD, the central processor immediately returns to the idle state. Assuming, however, that the machine retains the "ready" signal on lead CD, the processor remains in State F until T1 timer 204 times out, returning a bit on lead T1. In response to this time out, the central processor advances to State G.

When the central processor advances to State G, T1 timer 204 is reset (by applying the "0" bit to lead T1R) and the processor signals the data-processing machine that the data set is ready by applying a bit to lead CC. At the same time, the processor signals FSK modulator 203 over lead FS (DATA) to send a marking signal and simultaneously applies a "1" bit to lead SQUELCH, instructing the line unit to remove the squelch of the outgoing signals. Since the telephone line is off-hook, a continuous marking frequency is thereby sent to the line to advise the remote data station that the local data processing machine is answering the call. At the same time, the data processor applies a "1" bit to lead STATUS whereby receiver 201 is instructed to detect whether incoming carrier signals are of adequate amplitude. Thereafter, with the central processor still in State G, T1 timer 204 is called in to time the "abort" time interval, that is, to determine whether the incoming marking signals (on lead DEM (DATA)) together with carrier (on lead R/C) are received within a predetermined interval of time, or, in the absence thereof, to abort the call.

In the event that while the central processor is in State G the data machine returns to the "not ready" condition or the abort time interval terminates without marking signals and adequate carrier being received, the data processor will return to the idle State A (and thereby return the telephone line to the on-hook condition). If, however, marking signals with a carrier of adequate amplitude are received before the termination of the abort time the data processor will proceed to State H.

Upon the data processor proceeding to State H, T2 timer 205 is called in to determine whether the incoming marking carrier signal is continuously received for a predetermined interval of time. In State H, the abort timer (T1 timer 204) continues to time and the carrier detector timer (T2 timer 205) now begins to time concurrently. If during these timing intervals, while the processor is in State H, the data processor machine should return to the "not ready" condition or the abort timer should time out, the data processor returns to State A. Alternatively, if the incoming carrier should cease or the incoming signal goes spacing, the data processor proceeds to State I. In State I the carrier timer (T2 timer 205) is reset (but the abort timer proceeds to time). While in State I the data processor will return to idle State A if the machine becomes "not ready" or the abort timer should time out. The data processor will proceed from State I back to State H if marking carrier is again received.

Upon the return to State H, the carrier detector timer (T2 timer 205) again begins timing. Assume now that with the central processor in State H a continuous marking carrier is received for a sufficient interval of time for the carrier detector timer to time out and, further, assume that the machine is still in the "ready" condition and the abort timer has not timed out. In that event, the central processor proceeds to State J, wherein the data set is placed in the "data mode." Upon proceeding to State J, both timers T1 204 and T1 205 are reset and released, "1" bits are applied to output leads CB and CF to advise the data-processing machine that it is clear to send and carrier is being received, and, finally, central processor 202 cuts through the output of receiver 201 on lead DEM (DATA) to lead BB (DATA) and cuts through interface lead BA (DATA) to lead FS (DATA). This interconnects the data-processing machine with modulator 203 and receiver 201, permitting the machine to send data to the telephone line and receive incoming data from the telephone line.

The data-processing machine remains in State J so long as a marking carrier signal is received from the telephone line, with the exception that if the machine becomes "not ready" the central processor advances to State M, the disconnect mode, described hereinafter. If while in State J an incoming spacing signal with carrier is received, the central processor proceeds to State L. Alternatively, if incoming lead R/C indicates a loss of carrier, central processor 202 proceeds to State K and reapplies "0" bits to lead CF.

Consider first State L, wherein spacing is being received. In this State, central processor 202 calls in T1 timer 204 to time the incoming spacing signal to determine if the signal has a sufficient duration to comprise a spacing disconnect signal.

If the incoming carrier signal returns to marking, the central processor returns to State J, releasing T1 timer 204. Alternatively, if the incoming signal stays in the spacing condition but carrier is lost (such as a situation where the strength of the carrier signal falls below the predetermined threshold), which situation exists when a spacing signal is received on lead DEM (DATA) but a carrier signal is not received on lead R/C, then the central processor maintains its condition in State L but calls in T2 timer 205 to time the carrier failure interval. In a third possible situation in State L the processor may begin to receive a marking signal and a loss of carrier, and under this situation the central processor proceeds to State K. Finally, while the central processor is in State L, the data processing machine may become "not ready" and either T1 timer 204 or T2 timer 205 may time out. Under these three latter conditions the central processor proceeds to the disconnect State M.

Consider now State K wherein the incoming carrier has been lost. As previously described, under one condition the central processor may proceed to State K from State J. If this was due to a loss of carrier with a marking signal being received, then the central processor calls in T2 timer 205. If, however, this occurred because of a loss of carrier with a spacing signal being received, then the central processor calls in both T1 timer 204 and T2 timer 205 to concurrently time for incoming spacing disconnect signals and loss of carrier. While in State K the central processor will return to State J if marking carrier is again received, at which time the two timers will be released. If, while in State K, carrier is again received together with an incoming spacing signal, the central processor proceeds to State L and T2 timer 205 is released, whereby the spacing disconnect signal timing is continued (or initiated) and the carrier failure timing is terminated. Finally, while the central processor is in State K, if the machine becomes "not ready" or either T1 timer 204 or T2 timer 205 times out, the central processor proceeds to the disconnect State M.

In the disconnect State M the central processor resets the timers, disconnects the processing machine from the receiver and modulator, removes the clear-to-send bit applied to lead CB and applies a spacing signal to lead FS (DATA). Accordingly, the data set sends a spacing disconnect signal to the telephone line. The central processor then calls in T2 timer 205 to time the length of the spacing disconnect signal. At the termination of this interval T2 timer 205 pulses lead T2, whereupon the central processor returns to idle State A. This thus completes the call and in idle State A the data set disconnects from the telephone line.

Central Processor

Figure 5:
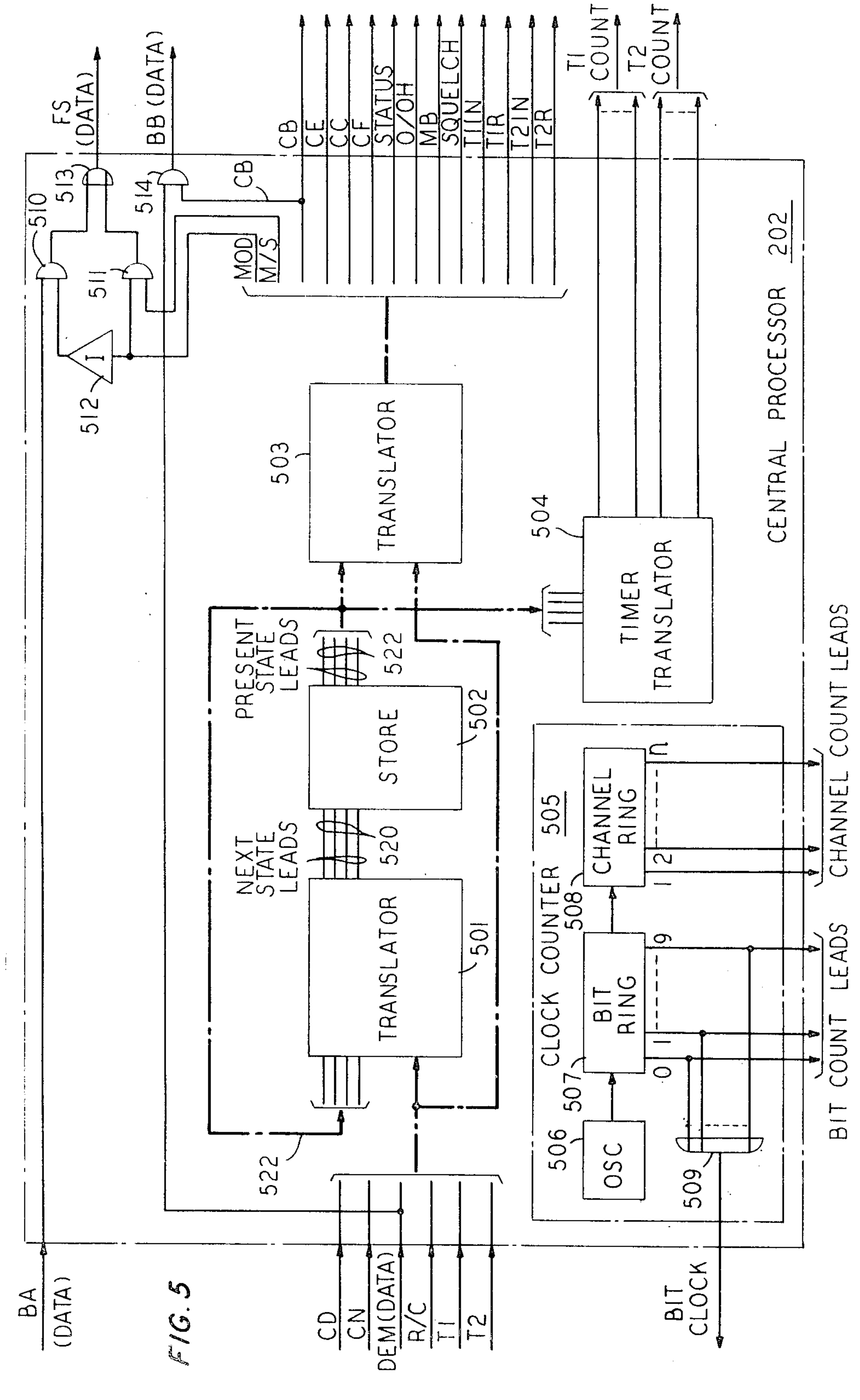
FIG. 5 discloses the details of the circuits and equipment of the common central processor.

The detail of central processor 202 is shown in FIG. 5. To provide the sequential functions described above, central processor 202 includes timer translator 504, translator 501, store 502 and translator 503.

Store 502 can be considered a delay store for delaying four bits of information applied thereto by way of NEXT STATE leads 520. Store 502 delays this input information for a scanning cycle and then reapplies this information to PRESENT STATE leads 522. Preferably store 502 comprises a plurality of shift registers, one shift register for each of the input or output leads, each shift register having a number of stages corresponding to the number of channels. The signal permutations on the input and output leads of store 502 define the various states of central processor 202. Since four leads are shown in FIG. 5, the leads have a capability of storing $2^4$ or 16 states. In the present embodiment, however, only 13 states are utilized.

The input to translator 501 constitutes PRESENT STATE leads 522 and input leads CD, CN, DEM (DATA), R/C, T1 and T2. These six latter leads are, of course, input leads to the central processor, as described above, and will hereinafter be referred to as the "input word." It is the function of translator 501 to accept the input word information and the present state information (on leads 522) and translate that information to the next state information, which is applied to NEXT STAGE leads 520. Translator 501 and store 502 therefore examine the present state with the input word to create the next stage and may be considered a sequential machine.

The outputs of store 502, that is, PRESENT STATE leads 522, extend to translator 503. The other inputs of translator 503 constitute the input word. Translator 503 accepts the information on PRESENT STATE leads 522 and the input word information and translates this input information to output information which is applied to fourteen leads; namely, leads MOD, M/S, CB, CE, CC, CF, STATUS, O/OH, MB, SQUELCH, T1 IN, T1R, T2 IN and T2R. These output leads can be considered the output word. It is to be noted that the latter 12 of the output leads also constitute output leads of central processor 202.

PRESENT STATE leads 522 also extend to the input of timer translator 504. Timer translator 504 provides outputs on leads T1 COUNT and T2 COUNT in accordance with the present state of the sequential machine. The signal permutations on these output leads, as previously described, are utilized to define the timing intervals of the timers.

Translator 501, translator 504 and timer translator 504 comprise multiterminal switching circuits or networks, sometimes called combinational switching circuits, wherein a set or sets of input variables determine corresponding output conditions. Translators for combinational switching circuits of this type are described, for example, in Chapter 9, pages 135 to 156 of *Introduction to the Logical Design of Switching Systems* by H. C. Torng, published by Addison-Wesley Publishing Company, Copyright 1964.

Summarizing the operation of the sequential machine, it is seen that for each time slot interval store 502 passes signal or bit permutations to PRESENT STATE leads 522 to define the present state of the machine. Translator 501 examines the present state of the machine together with the input word to produce the signal permutations defining the next state of the machine, which signal permutations are passed to NEXT STATE leads 520. In addition, translator 503 examines the present state of the machine together with the input word to produce the output word. At the same time timer translator 504 examines the present state of the machine to produce the time interval counts on the T1 COUNT leads and T2 COUNT leads.

To define in detail the specific sequential operations of the sequential machine, the table below is presented.

| Pres. state | Input word | Next state | $T_1$ in | $T_2$ in | SQL. | M/S | MOD | O/OH | MB | CE | CB | CC | CF | STA | $T_1$R | $T_2$R |
|---|---|---|---|---|---|---|---|---|---|---|---|---|---|---|---|---|
| A | X0X0XX | A | 0 | 0 | 0 | X | X | 0 | 0 | 0 | 0 | 0 | 0 | 0 | 0 | 0 |
| A | X1X0XX | B | 0 | 0 | 0 | X | X | 0 | 1 | 0 | 0 | 0 | 0 | X | 0 | 0 |
| A | XXX1XX | C | 0 | 1 | 0 | X | X | 0 | 0 | 0 | 0 | 0 | 0 | 0 | 0 | 1 |
| B | X0XXXX | A | 0 | 0 | 0 | X | X | 0 | 0 | 0 | 0 | 0 | 0 | 0 | 0 | 0 |
| B | X1XXXX | B | 0 | 0 | 0 | X | X | 0 | 1 | 0 | 0 | 0 | 0 | X | 0 | 0 |
| C | XXX1X0 | C | 0 | 1 | 0 | X | X | 0 | 0 | 0 | 0 | 0 | 0 | 0 | 0 | 1 |
| C | XXX0X0 | D | 1 | 0 | 0 | X | X | 0 | 0 | 0 | 0 | 0 | 0 | 0 | 1 | 1 |
| C | XXX1X1 | E | 0 | 0 | 0 | X | X | 0 | 0 | 1 | 0 | 0 | 0 | 0 | 0 | 1 |
| C | 1XX0X1 | F | 0 | 0 | 0 | X | X | 1 | 0 | 0 | 0 | 0 | 0 | X | 0 | 0 |
| D | XXXX1X | A | 0 | 0 | 0 | X | X | 0 | 0 | 0 | 0 | 0 | 0 | 0 | 0 | 0 |
| D | XXX100 | C | 0 | 1 | 0 | X | X | 0 | 0 | 0 | 0 | 0 | 0 | 0 | 0 | 1 |
| D | XXX000 | D | 1 | 0 | 0 | X | X | 0 | 0 | 0 | 0 | 0 | 0 | 0 | 1 | 1 |
| D | XXX101 | E | 0 | 0 | 0 | X | X | 0 | 0 | 1 | 0 | 0 | 0 | 0 | 0 | 1 |
| D | 1XX001 | F | 0 | 0 | 0 | X | X | 1 | 0 | 0 | 0 | 0 | 0 | X | 0 | 0 |
| E | 0XX0XX | D | 1 | 0 | 0 | X | X | 0 | 0 | 0 | 0 | 0 | 0 | 0 | 1 | 1 |
| E | XXX1XX | E | 0 | 0 | 0 | X | X | 0 | 0 | 1 | 0 | 0 | 0 | 0 | 0 | 1 |
| E | 1XX0XX | F | 0 | 0 | 0 | X | X | 1 | 0 | 0 | 0 | 0 | 0 | X | 0 | 0 |
| F | 0XXXXX | A | 0 | 0 | 0 | X | X | 0 | 0 | 0 | 0 | 0 | 0 | 0 | 0 | 0 |
| F | 1XXX0X | F | 1 | 0 | 0 | X | X | 1 | 0 | 0 | 0 | 0 | 0 | X | 1 | 0 |
| F | 1XXX1X | G | 0 | 0 | 1 | 0 | 1 | 1 | 0 | 0 | 0 | 1 | 0 | 1 | 0 | 0 |
| G | (0XXXXX) (1XXX1X) | A | 0 | 0 | 0 | X | X | 0 | 0 | 0 | 0 | 0 | 0 | 0 | 0 | 0 |
| G | (1XX00X) (1X110X) | G | 1 | 0 | 1 | 0 | 1 | 1 | 0 | 0 | 0 | 1 | 0 | 1 | 1 | 0 |
| G | 1X010X | H | 1 | 1 | 1 | 0 | 1 | 1 | 0 | 0 | 0 | 1 | 0 | 1 | 1 | 1 |
| H | (0XXXXX) (1XXX1X) | A | 0 | 0 | 0 | X | X | 0 | 0 | 0 | 0 | 0 | 0 | 0 | 0 | 0 |
| H | 1X0100 | H | 1 | 1 | 1 | 0 | 1 | 1 | 0 | 0 | 0 | 1 | 0 | 1 | 1 | 1 |

| | | | | | | | | | | | | | | | | |
|---|---|---|---|---|---|---|---|---|---|---|---|---|---|---|---|---|
| H | (1X110X) | | | | | | | | | | | | | | | |
| | (1XX00X) | I | 1 | 0 | 1 | 0 | 1 | 1 | 0 | 0 | 0 | 1 | 0 | 1 | 1 | 0 |
| H | 1X0101 | J | 0 | 0 | 1 | X | 0 | 1 | 0 | 0 | 1 | 1 | 1 | 1 | 0 | 0 |
| I | (0XXXXX) | | | | | | | | | | | | | | | |
| | (1XXX1X) | A | 0 | 0 | 0 | X | X | 0 | 0 | 0 | 0 | 0 | 0 | 0 | 0 | 0 |
| I | 1X010X | H | 1 | 1 | 1 | 0 | 1 | 1 | 0 | 0 | 0 | 1 | 0 | 1 | 1 | 1 |
| I | (1XX00X) | | | | | | | | | | | | | | | |
| | (1X110X) | I | 1 | 0 | 1 | 0 | 1 | 1 | 0 | 0 | 0 | 1 | 0 | 1 | 1 | 0 |
| J | 1X01XX | J | 0 | 0 | 1 | X | 0 | 1 | 0 | 0 | 1 | 1 | 1 | 1 | 0 | 0 |
| J | 1X00XX | K | 0 | 1 | 1 | X | 0 | 1 | 0 | 0 | 1 | 1 | 0 | 1 | 0 | 1 |
| J | 1X10XX | K | 1 | 1 | 1 | X | 0 | 1 | 0 | 0 | 1 | 1 | 0 | 1 | 1 | 1 |
| J | 1X11XX | L | 1 | 0 | 1 | X | 0 | 1 | 0 | 0 | 1 | 1 | 1 | 1 | 1 | 0 |
| J | oXXXXX | M | 0 | 0 | 1 | 1 | 1 | 1 | 0 | 0 | 0 | 1 | 0 | X | 0 | 0 |
| K | 1X0100 | J | 0 | 0 | 1 | X | 0 | 1 | 0 | 0 | 1 | 1 | 1 | 1 | 0 | 0 |
| K | 1X1000 | K | 1 | 1 | 1 | X | 0 | 1 | 0 | 0 | 1 | 1 | 0 | 1 | 0 | 1 |
| K | 1X0000 | K | 0 | 1 | 1 | X | 0 | 1 | 0 | 0 | 1 | 1 | 0 | 1 | 1 | 1 |
| K | 1X1100 | L | 1 | 0 | 1 | X | 0 | 1 | 0 | 0 | 1 | 1 | 1 | 1 | 1 | 0 |
| J | (0XXXXX) | | | | | | | | | | | | | | | |
| K | (XXXX1X) | M | 0 | 0 | 1 | 1 | 1 | 1 | 0 | 0 | 0 | 1 | 0 | X | 0 | 0 |
| | (XXXXX1) | | | | | | | | | | | | | | | |
| L | 1X0100 | J | 0 | 0 | 1 | X | 0 | 1 | 0 | 0 | 1 | 1 | 1 | 1 | 0 | 0 |
| L | 1X0000 | K | 0 | 1 | 1 | X | 0 | 1 | 0 | 0 | 1 | 1 | 0 | 1 | 0 | 1 |
| L | 1X1100 | L | 1 | 0 | 1 | X | 0 | 1 | 0 | 0 | 1 | 1 | 1 | 1 | 1 | 0 |
| L | 1X1000 | L | 1 | 1 | 1 | X | 0 | 1 | 0 | 0 | 1 | 1 | 0 | 1 | 1 | 1 |
| | (0XXXXX) | | | | | | | | | | | | | | | |
| L | (XXXX1X) | M | 0 | 0 | 1 | 1 | 1 | 1 | 0 | 0 | 0 | 1 | 0 | X | 0 | 0 |
| | (XXXXX1) | | | | | | | | | | | | | | | |
| M | XXXXX1 | A | 0 | 0 | 0 | X | X | 0 | 0 | 0 | 0 | 0 | 0 | 0 | 0 | 0 |
| M | XXXXX0 | M | 0 | 1 | 1 | 1 | 1 | 1 | 0 | 0 | 0 | 1 | 0 | X | 0 | 1 |

In the table the first column defines the present state, with the second column defining the input word, that is, the signal permutations on leads CD, CN, DEM (DATA), R/C, T1 IN and T2 IN.

Assuming these two conditions are then present, the next column identifies the next state as defined by the signal permutations on NEXT STATE leads 520. The following fourteen columns then present the output word, the column headings corresponding to the output leads of the output word. In the table each "1" and each "0" corresponds to a "1" bit or a "0" bit on the identified lead. An "*x*" entry in the input word indicates a "don't care" count, that is, a condition where it is immaterial what the bit is that is applied thereto. Similarly, an "*x*" entry in any one of the output words indicates an immaterial condition. A quick examination of several lines as examples will suffice for all lines. Taking the first line, for example, it is assumed that the central processor present state is A and input leads CN and R/C have "0" bits applied thereto. The next state, or the resultant output of translator 501, will constitute State A. Thus, under this situation, central processor 202 will remain in State A for the time slot in the next cycle. At the same time, in the present state the output word is disclosed across the next fourteen columns. It is noted, for example, that a "0" bit is applied to lead SQUELCH. As previously disclosed, this functions to instruct the line unit to squelch the outgoing signal. Similarly, in this condition a "0" bit is applied to lead O/OH. Thus the line unit is instructed to remain on-hook.

If the last line of the table be examined, it is seen that the present state of the machine is State M and a "0" bit is applied to input lead T2. Thus, under this condition, central processor 202 is sending out the spacing disconnect signal and T2 timer 205 has not timed out. It is noted here that output lead T2 IN has a "1" bit applied thereto, as does output lead T2R. Thus, T2 counter 205 has been called in and is being advanced (if a "0" bit is applied to lead T2 IN, then the counter is not being advanced, and if a "0" bit is applied to T2R, then the counter is being reset). It is also noted that a "1" bit is applied to output leads M/S and MOD. The "1" bit applied to lead M/S designates a spacing signal. With the "1" bit also applied to lead MOD, AND-gate 511 is enabled, as previously described and the spacing signal on lead M/S is also passed to output lead FS (DATA). Each of the other detailed steps of central processor 202 similarly can be determined, together with the output word thereby generated from an examination of the table.

The passage of the data signals through central processor 202 is implemented by AND-gates 510, 511 and 514, together with inverter 512 and OR gate 513. When translator 503 passes a "0" bit to output lead MOD, this bit disables AND-gate 511 and by virtue of the inversion provided by inverter 512, enables AND-gate 510. Accordingly, when a "0" bit is passed to lead MOD by translator 503, the data on lead BA (DATA) is passed through central processor 202 by way of AND-gate 510 and OR-gate 513 to output lead FS (DATA). If however, a "1" bit is applied to lead MOD, AND-gate 511 is enabled and AND-gate 510 is disabled. Under this situation the data applied to translator 503 and output lead M/S is passed through enabled AND-gate 511 and OR-gate 513 to output lead FS (DATA). This situation occurs when the data set transmits the initial-marking character and a spacing disconnect, the marking or spacing signal being applied to lead M/S and passed to output lead FS (DATA).

The input signals on lead DEM (DATA) in addition to constituting part of the input word, are also passed to AND-gate 514. Gate 514, in turn, is enabled when a "1" bit is applied to lead CB by translator 503. In this latter situation, with AND-gate 514 enabled, the data on lead DEM (DATA) passes through enabled AND-gate 514 to output lead BB (DATA).

Central processor 202 also includes clock counter 505. Clock counter 505 provides the various bit and channel counts together with the bit clock. Clock counter 505 includes oscillator 506, bit ring 507 and channel ring 508. Oscillator 506 provides an output wave having a frequency corresponding to the frequency of the bit clock. The output of oscillator 506 is passed to bit ring 507, which is a nine-stage ring similarly passing pulses to the bit count leads. The final stage of bit ring 507 is passed to the input of channel ring 508, which is a 1 to *n*-stage ring similarly passing pulses to the channel leads. The various output leads of bit ring 507 are ORed through OR-gate 509 to the bit clock lead. Accordingly, the previously described bit count, channel count and bit clock pulses are generated in central processor 202.

Receiver and Carrier and Ringing Detector

Figures 3, 4:
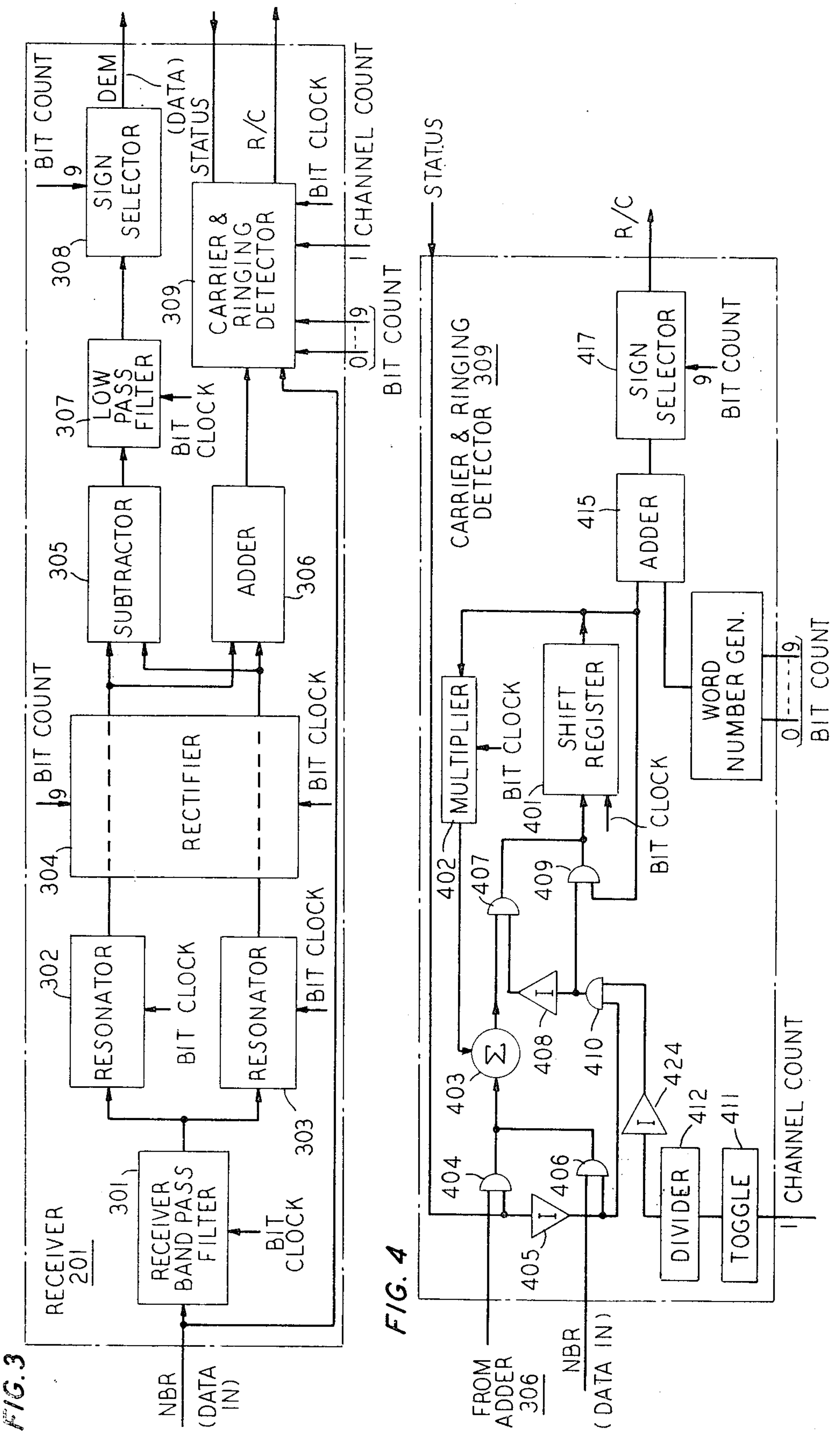
FIG. 3 shows, in schematic form, the details of a receiver arranged in accordance with this invention.
FIG. 4 shows, in schematic form, the details of the common detector of carrier and ringing signals.

The details of receiver 201 are shown in FIG. 3. Receiver 201, as previously described, provides two general functions; namely, 1. to receive serial bit numbers applied to input lead NBR (DATA IN) and process the several numbers in each corresponding time slot by use of digital filter techniques and thereby derive output signal samples which designate the baseband data signal derived from the incoming frequency-shift signal; and 2. further process the incoming numbers to detect incoming carrier or ringing signals.

Considering first the function of processing the numbers to derive the baseband data signal, the specific circuitry which provides this function comprises receiver band-pass filter 301, resonators 302 and 303, rectifier 304, subtractor 305, low-pass filter 307 and sign selector 308.

Receiver band-pass filter 301 is advantageously the fourth-order Butterworth band-pass filter with the band pass passing from 1,020 Hz. to 1,320 Hz. The output of band-pass filter 301 is passed to a discriminator which includes resonator 302 and resonator 303, one of which is tuned to 1,020 Hz. and the other to 1,320 Hz. The outputs of the discriminator are full wave rectified (in a numerical sense) by rectifier 304 and the two rectified outputs thus obtained are subtracted one from the other by subtractor 305. The output of subtractor 305 is fed to low-pass filter 307, which has a cutoff frequency of 300 Hz. The numbers emerging from the low-pass filter represent the recovered value of the baseband signals and sign selector 308 uses the sign of these numbers to develop the baseband signal samples which are passed to output lead DEM (DATA). With respect to the specific arrangements of these circuits in receiver 201, they are advantageously of the type described in the application of C. A. Buzzard et al., Ser. No. 884,250, filed concurrently herewith, which application discloses correspondingly identified circuits for recovering baseband signals.

The detection of carrier and ringing signals is provided by a carrier and ringing detector generally indicated by block 309. In general, when a "0" bit is applied by central processor 202 to lead STATUS, carrier and ringing detector 309 provides a bit output to lead R/C in response to the reception of a ringing signal (in the numerical sense) received over lead NBR (DATA IN). Alternatively, when central processor 202 applies a "1" bit to lead STATUS, carrier and ringing detector 309, in cooperation with receiver band-pass filter 301, resonators 302 and 303, rectifier 304 and adder 306, applies a bit to lead R/C in response to the reception of a carrier signal (in a numerical sense) received over lead NBR (DATA IN).

The details of carrier and ringing detector 309 are shown in FIG. 4. The major function of detector 309 is to provide digital filtering through the use of a recursive digital filter circuit which includes shift register 401, multiplier 402 and summing network or adder 403. Shift register 401 functions as a unit (or scanning cycle) delay circuit and has a sufficient number of stages to store the 10-bit words of all of the channels (that is, 10*n* stages). Multiplier 402 (which is substantially arranged in the same way as the correspondingly identified multipliers described in the aforementioned application of C. A. Buzzard et al.), is provided with a multiplication constant determined by the denominator coefficient of the filter. The resultant function is to provide a low-pass filter (in a numerical sense), the output being passed to adder 415.

Adder 415, together with word number generator 416, form a threshold circuit. Generator 416 is of the type disclosed in the application of C. A. Buzzard et al. and functions to define (in this embodiment) a threshold number which, when added to the filter output number, produces a resultant number whose amplitude always exceeds a threshold (such as being always positive) when a ringing or carrier signal input is applied to the filter. Sign selector 417 (which is also of the type disclosed in the C. A. Buzzard et al. application) then detects the sign of the number and produces, at its output, a bit (such as a "1" bit) when the amplitude of the signal exceeds the threshold (that is, the signal, in a numerical sense, is positive). This bit is passed to lead R/C to the central processor.

Assume now that central processor 202 instructs receiver 201 to look for carrier signals. A "1" bit is therefore applied to lead STATUS. This "1" bit is passed to gate 404 and the gate is, therefore, enabled. It is noted here that inverter 405 inverts the "1" bit on lead STATUS and therefore disables AND-gates 406 and 410. Gate 410, disabled, enables gate 407 via inverter 408. With gate 404 enabled, the output of adder 306 is applied to an input of adder 403.

The two inputs of adder 306 are connected to the outputs of rectifier 304. Each output of rectifier 304 develops a signal which is the rectified product of the incoming mark (or space) signal. These two rectified signals are then added, by adder 306, to produce a signal amplitude which is the sum of the responses of both resonators to the incoming signal frequency. The output of adder 306 is now passed to adder 403 and filtered, as described above. Word number generator 416 and adder 415 determine the signal threshold and, if the carrier signal amplitude exceeds this determined threshold, sign selector 417 applies a "1" bit to lead R/C. Alternatively, if the threshold is not attained by the amplitude of the carrier signal, sign selector 417 applies a "0" bit to lead R/C.

Assume now that central processor 202 instructs receiver 201 to look for ringing signals. A "0" bit is therefore applied to lead STATUS. This "0" bit is passed to gate 404 and the gate is therefore disabled. Inverter 405 now inverts the "0" bit on lead STATUS and therefore enables AND gates 406 and 410. With gate 404 disabled, the output of adder 306 is disconnected from the input of adder 403.

The enabling of AND-gate 406 now passes the incoming signals on lead NBR (DATA IN) to the input of adder 403. Carrier and ringing detector 309, and specifically, the low-pass digital filter therein, now detects the incoming signal from the telephone line. Since, it is recalled, receiver 201 is now looking for ringing signals, the function of carrier and ringing detector 309 is to detect whether or not incoming ringing signals are being received on the telephone line. These ringing signals are, of course, 20-cycle signals, whereas the incoming number samples derived from lead NBR (DATA IN) are sampled at a rate especially designed for incoming data signals (1,270 Hz.-marking frequency and 1,070 Hz.-spacing frequency). Accordingly, the filter must be arranged to "-hold" the incoming numbers for a plurality of unit delays to render the filter effective for the low frequency ringing signal. Specifically, the filter is arranged to "hold" the input numbers for 64 unit delays which is appropriate for the ringing signal frequency in view of the incoming data signal frequency.

The number of unit intervals that the filter holds the input number is determined by toggle 411 and divider 412. The input of toggle 411 comprises the lead 1 of the CHANNEL COUNT leads. Toggle 411, therefore, is driven to one state by the channel 1 pulse and to the other state by the next channel 1 pulse. The output of toggle 411, therefore, comprises a prolonged condition (such as a high condition) for one scanning cycle and an inverse condition for the next scanning cycle. These alternate conditions are applied to divider 412, which divides them by 32. As a result thereof the output of divider 412 comprises a prolonged condition (which in this case is a high condition) for one scanning cycle and a low condition for the next 63 cycles. The output of divider 412 is connected through inverter 424 to gate 410. Gate 410 is therefore disabled for 1 scanning cycle out of 64 since as previously disclosed, gate 410 is otherwise enabled by inverter 405. The output of gate 410 is connected to gate 409 and to gate 407 by way of inverter 408. Accordingly, gate 407 is enabled for 1 scanning cycle out of 64 while gate 409 is enabled for 63 scanning cycles out of 64.

It is recalled that the incoming signals on lead NBR (DATA IN) are passed through AND-gate 406 to adder 403. It is further recalled that the other input to adder 403 is the output of multiplier 402. The output of adder 403 is then passed to unit delay shift register 401 by way of AND-gate 407. Since AND-gate 407 is enabled for 1 scanning cycle out of 64, it is apparent that the incoming signal on lead NBR (DATA IN) is inserted in the shift register for 1 scanning cycle out of 64. During the remaining 63 cycles, AND-gate 407 blocks the output of adder 403 and, of course, feedback through multiplier 402. At the same time, however, AND-gate 409 is enabled. The output number from shift register 401 is therefore recirculated through AND-gate 409 back to the input of shift register 401. Accordingly, the bit frequency of the input number is maintained, but the effective sampling frequency is divided by 64.

The output of shift register 401 is passed through the threshold circuit comprising adder 415 and word number generator 416 and the threshold circuit output is applied to sign selector 417, whose output extends to lead R/C, as previously described. Accordingly, when the low frequency ringing signal is received, sign selector 417 applies a "1" bit to lead R/C, whereas if the ringing signal is not received, sign selector 417 applies a "0" bit to lead R/C.

Line Units

The details of line unit $101_1$, which is typical of the line units, is shown in FIG. 1. As previously described, line unit $101_1$ terminates telephone line $100_1$. With the data set in the idle state, telephone line $100_1$ is terminated by the primary of transformer TR in series with capacitor C1. In this state central processor 202 is supplying "0" bits to leads SQUELCH, MB and O/OH. The "0" bit to lead SQUELCH disables gate 108, blocking the output of modulator 203 on lead NBR (DATA OUT), thereby squelching the outgoing signal. The "0" bit on lead MB is inverted by inverter 115 to enable gate 111. The pulse on lead 1 of the CHANNEL COUNT leads is therefore gated through to the CLEAR input of flip-flop 109. With flip-flop 109 clear, no current passes through its terminal "1" output through the core of relay BY. Relay BY is therefore released and its contacts connected across telephone line $100_1$ are therefore opened.

The "0" bit on lead O/OH is inverted by inverter 116 to enable gate 114. Gate 114 therefore passes the pulse on the CHANNEL COUNT lead to clear flip-flop 112. With flip-flop 112 clear, current is not passed from its terminal "1" through the core of relay LC. Relay LC is therefore released and the "make" contacts of the relay connected across capacitor C1 are opened. In addition, the "transfer" contacts of relay LC, with the relay released, disconnect the output of amplifier filter 102 from the input of analog-to-bit converter 103, while connecting the input of analog-to-bit converter 103 to rectifier diodes D1 and D2 by way of resistor R2 and reversely poled diodes D3.

If the data-processing machine now provides a "make-busy" request, the data set goes to State B and a "1" bit is applied to lead MB, as previously described. The "1" bit on lead MB enables AND gate 110 to pass the pulse on the CHANNEL COUNT leads, thereby setting flip-flop 109. The setting of flip-flop 109 now passes current through relay BY. This connects the tip lead $T_1$ of telephone line $100_1$ to the ring lead $R_1$ by way of the "make" contacts of relay BY and resistor R1. Accordingly, a low-impedance path shunts the telephone line and, in accordance with telephone practice, an indication is provided to the remote central station that the terminal set is busy. Of course, when the "busy" indication is removed by the data-processing machine and the data set returns to idle State A, a "0" bit is applied to lead MB and flip-flop 109 is cleared to release relay BY. This removes the "busy" indication.

If, with the data set in State A, a ringing signal is received, this signal is, of course, applied through capacitor C1 and the primary of transformer TR. The secondary of transformer TR therefore applies the ringing signal to rectifier diodes D1 and D2. The ringing signal is of sufficient amplitude to be passed through reversely poled diodes D3, resistor R2 and the normally closed contacts of the "transfer" contacts of relay LC to the input of analog-to-bit converter 103.

The function of analog-to-bit converter 103 is to scan the incoming signal and provide at its output a square wave signal having crossings occurring nearly concurrently with the incoming signal crossings and corresponding in level to the polarity of the incoming signal. The square wave signal is therefore analogous to an alternating signal which has been hard limited. Advantageously, the analog-to-bit converter is of the type disclosed in the above-mentioned copending application of C. A. Buzzard et al. This square wave signal is then passed to gate 104.

The other input to gate 104 is connected to lead 1 of the CHANNEL COUNT leads. The output of gate 104 extends to the input of word number generator 105 by way of lead BIT 1 (DATA IN). Line unit $101_1$ is, therefore, passing to word number generator 105 a signal sample of the incoming signal during the time slot allocated to the line unit. Of course, at this time the signal sample thus passed is a sample of the incoming ringing signal.

It is recalled that when valid ringing is detected, the data set advances to State F and the line unit is placed off-hook. Thereafter, the "quiet" interval is timed and the data set advances to State G, whereupon the squelch is removed. These two functions are accomplished by central processor 202 applying "1" bits to each of leads SQUELCH and O/OH. The application of a "1" bit to lead SQUELCH passes a "1" bit to gate 108. This removes the previously described disabling condition applied by lead SQUELCH to gate 108. At the same time, as previously described, modulator 203 is enabled to send a marking signal or, more specifically, a sequence of numbers corresponding to the marking signal. This number is passed to lead NBR (DATA OUT), which lead extends to a second input of AND-gate 108. The third input of AND-gate 108 is connected to lead 1 of the CHANNEL COUNT leads. Accordingly, during the first time slot, the output of modulator 203 is passed through AND-gate 108 to digital-to-analog converter 106.

Digital-to-analog converter 106 comprises a conventional digital circuit operating under control of the bit clock to convert the input digital number to a corresponding analog signal. That is, the analog signal developed by the digital-to-analog converter has an amplitude corresponding to the digital number supplied by modulator 203. This analog signal is then passed through a low-pass filter, such as low-pass filter 107. This removes all of the aliases normally generated by digital filter modulator 203. The output FSK signals of low-pass filter 107 are then applied to the secondary of transformer TR.

Returning now to the "1" bit applied to lead O/OH, this "1" bit is passed to AND-gate 113 to enable the gate. Gate 113 gates through the CHANNEL COUNT pulse to set flip-flop 112. With flip-flop 112 set, current is passed from its terminal "1" output through the core of relay LC. Relay LC thereupon operates, connecting the primary winding of transformer TR directly to telephone line $100_1$. The outgoing frequency-shift signals applied to the secondary of transformer TR by low-pass filter 107 are therefore directly applied to the telephone line by the primary of transformer TR.

The operation of relay LC also connects the output of amplifier filter 102 to the input of analog-to-bit converter 103 by way of the "make" contacts of the transfer contacts of relay LC. At the same time, the normally closed contacts of relay LC open to disconnect rectifier diodes D1 and D2 from analog-toebit converter 103. Incoming signals now received from telephone line $100_1$ are therefore now applied by the secondary winding of transformer TR to amplifier filter 102. These incoming frequency-shift data signals are filtered and amplified and then passed to the input of analog-to-bit converter 103. The bit samples passed by gate 104 are now samples of the incoming frequency-shift data signals.

When a data set returns to the idle State, "0" bits are again applied to lead SQUELCH and lead O/OH and gate 108 is again blocked to squelch outgoing signals. At the same time, flip-flop 112 is cleared, deenergizing relay LC. The release of relay LC disconnects the output of amplifier filter 102 and reconnects the output of rectifier diodes D1 and D2 to analog-to-bit converter 103 and, in addition, reinserts capacitor C1 in the telephone line. This restores line unit $101_1$ to the initial condition.

Interface Units

The details of interface unit $210_1$, which unit is typical of all of the interface units, are shown in FIG. 2. Interface unit $210_1$ has included therein gates 211 through 213 for gating the outputs of data-processing machine $200_1$ to central processor 202. The input to gates 211 through 213 is connected to lead 1 of the CHANNEL COUNT leads, whereby the gates are enabled for the first time slot. While the gates are enabled they pass the information on leads $BA_1$, $CD_1$ and $CN_1$ to leads BA (DATA), CD and CN. The latter leads extend, of course, to central processor 202 and the information from data-processing machine $200_1$ is therefore applied to these leads during the first time slot.

Interface unit $210_1$ also includes gates 214 through 223 and inverters 224 through 228. These circuits function to distribute the information from central processor 202 on lead BB (DATA), CB, CE, CC and CF. One input of gates 214 through 223 is connected to lead 1 of the CHANNEL COUNT leads. Therefore, the gates are enabled during the first time slot. Leads BB (DATA), CB, CE, CC and CF extend to one input of gates 214, 216, 218, 220 and 222, respectively, and to one input of gates 215, 217, 219, 221 and 223, respectively, by way of inverters 224 through 228. Since gates 214 through 223 are enabled during the first time slot, a "1" bit applied to any of these output leads by central processor 202 will set a corresponding one of flip-flops 230 through 234. Alternatively, a "0" bit applied by central processor 202 during the first time slot to one of the output leads clears a corresponding one of flip-flops 230 through 234.

Leads BB, CB, CE, CC and CF are connected to the terminal "1" outputs of flip-flops 230 through 234. These leads extend to data processing machine $200_1$ to supply the previously described information to the processing machine. If one or more of flip-flops 230 through 234 are set by central processor 202, the corresponding output lead condition is high, which condition is therefore passed through the corresponding one of leads $BB_1$, $CB_1$, $CE_1$, $CC_1$ and $CF_1$ to processing machine $200_1$.

Accordingly, interface unit $210_1$ distributes the output of central processor 202 during the first time slot to data processing machine $200_1$ and, alternatively, multiplexes the output of machine $200_1$ on the input leads to central processor 202.

Although a specific embodiment of this invention has been shown and described, it will be understood that various modifications may be made without departing from the spirit of this invention.

What is claimed is:

1. A multiple data set for interconnecting a plurality of data machines capable of transmitting and receiving baseband data signals with a corresponding plurality of transmission channels capable of carrying voice frequency signals comprising:
   - a receiver, which includes digital circuitry, for converting voice frequency signal samples to baseband data signal samples;
   - a modulator, which includes digital circuitry for converting baseband data signal samples to voice frequency signal samples;
   - scanning means for deriving samples of the incoming voice frequency signals from all of the channels during each of successive scanning cycles and applying the samples of the signal from each channel to the receiver during a time slot allocated to the channel in each cycle;
   - distributing means for distributing the output signal samples obtained from the modulator to each channel during the time slot allocated thereto; and
   - common processing means responsive to an incoming call on any channel for distributing the output baseband data samples obtained from the receiver during the allocated time slot to the corresponding machine and for supplying samples of the baseband data signal obtained from the corresponding machine to the modulator during the allocated time slot.

2. A multiple data set in accordance with claim 1 wherein the common processing means comprises a sequential machine which assumes various states during the time slots allocated to each of the channels.

3. A multiple data set in accordance with claim 2 wherein the sequential machine includes translating means responsive to the incoming calls and the incoming signals from each of the channels for determining the identity of the next state to be assumed during the time slot allocated to the channel.

4. A multiple data set in accordance with claim 2 wherein the sequential machine includes translating means responsive to the incoming calls and the incoming signals from each of the channels and to the state assumed by the sequential machine for controlling the data sample distribution and application provided by the common processing machine.

5. A multiple data set in accordance with claim 4 wherein means responsive to the translating means are provided for each channel for alternatively placing the channel in an on-hook condition and an off-hook condition.

6. A multiple data set in accordance with claim 4 wherein the sequential machine includes means for generating signal samples of supervisory signals and the translating means alternatively applies to the modulator the data samples obtained from the data machine and the supervisory signal samples.

7. In a multiple data set for processing signals received from a plurality of transmission channels;
   - detecting means which includes digital circuitry and which is alternatively arrangeable to detect incoming ringing and incoming carrier signals from each of the channels; and
   - a processor for time-sharing the detecting means among the plurality of channels, the said processor including means for initially arranging the detecting means to detect ringing signals while the detecting means is allocated to each channel and means responsive to the detection of ringing signals from any channel for arranging the detecting means to detect carrier signals while the detecting means is allocated to the channel 8. In a multiple data set in accordance with claim 7 wherein the detecting means comprises a low-pass filter, a first path for applying signals received from the channels to the filter, a second path for summing the signal frequencies received from the channels and applying the summed signals to the filter and gating means responsive to the processor for enabling the first path during the initial period when the detecting means is arranged to detect ringing signals and for enabling the second path during the period when the detecting means is arranged to detect carrier signals.

9. In a multiple data set in accordance with claim 8 wherein the low-pass filter comprises a digital filter and the second path includes at least two digital filters, in parallel, and an adder circuit for summing the output of the parallel digital filters.

* * * * *